Nov. 23, 1971 J. N. ANTONEVICH 3,621,705

METHODS AND APPARATUS FOR TESTING GLASSWARE

Filed Aug. 10, 1970

INVENTOR
John N. Antonevich

United States Patent Office 3,621,705
Patented Nov. 23, 1971

3,621,705
METHODS AND APPARATUS FOR TESTING GLASSWARE
John N. Antonevich, Jamestown, N.Y., assignor to Blackstone Corporation
Continuation-in-part of application Ser. No. 749,533, Aug. 1, 1968. This application Aug. 10, 1970, Ser. No. 62,259
Int. Cl. G01n *3/32, 3/38*
U.S. Cl. 73—12  3 Claims

ABSTRACT OF THE DISCLOSURE

A method of detecting articles containing defects such as hair line cracks, fire checks comprises impacting the glassware against a source of vibration. An apparatus is provided having an ultrasonic transducer and means adapted to impact an article to be tested against a source of vibration.

---

This application is a continuation-in-part of my copending application Ser. No. 749,533, filed Aug. 1, 1968.

This invention relates to methods and apparatus for testing glassware and particularly to methods of testing glassware for defects such as cracks, fire checks and similar fracture flaws by impacting the ware against a source of vibration such as an ultrasonic transducer and apparatus by means of which such glassware may be destructively tested.

Products which involve glass bodies such as electron tubes and glass jars for food preservation frequently contain minute cracks or fire checks which cannot readily be detected by visual inspection or by any ordinary means. Inspection of such objects is accordingly a major problem in the industry. Many efforts to solve this problem have been attempted by various elaborate and time consuming methods such as pressurizing in the case of hollow vessels and measuring the leakage, by scanning and measuring light refractions and by testing end products after a specified period of shelf life or a specified period of operation. None of these methods has, however, proven to be entirely satisfactory.

In the food industry cracks or fire checks in jars are dangerous in that they can result in spoilage which may in turn cause illness to the consumer or they may result in fractures during opening which lacerate or injure the consumer. In application where glass to metal seals are involved such as metal seals in vacuum tubes or hermetically sealed components, these defects may result in a failure of the component at a critical time in the operation of a system of which they are a part. At the present time the most advanced inspection techniques of the glass industry has reduced in field jar rejects or failures to about 5%.

I have developed a method and apparatus for inspection which reduces in field rejects of jars, for example, to less than 1% without loss of fracture free jars as compared to the previous 5%. In the case of defective seals my process and apparatus will shatter or open up the defective seal so that it can be immediately found without significant loss of good seals.

Preferably I provide a method which comprises the subjecting of glassware to be tested to ultrasonic impact stress. I provide preferably an apparatus comprising an ultrasonic transducer, a velocity transformer driven by said ultrasonic transducer, means for impacting the glassware to be tested against the velocity transformer, and a conveyor for articles to be tested adjacent said velocity transformer and said means for impacting adapted to deliver an article to be tested into contact with the means impacting the article against the face of the velocity transformer. Preferably the face of the velocity transformer and the means for impacting are fitted with hard wear surfaces or shoes made of a material such as tungsten carbide or Latrobe Steel Company's BR 4 abrasion resistant steel. Alternatively the face of the velocity transformer could be a compliant material such as foam rubber. The velocity transformer and means for impacting are preferably placed on opposite sides of the article to be tested. A sensing device, such as a proximity switch, is preferably arranged adjacent the conveyor to energize each of the transducers and the means for impacting only when an article to be tested is delivered to them so as to avoid continuous operation of the apparatus. The velocity transformer and associated ultrasonic transducer are preferably adapted to produce high ultrasonic impact velocities. The means for impacting is preferably a low frequency, moderately high displacement vibrator although it may be a pneumatic or hydraulic cylinder and piston or a solenoid. If the level of ultrasonic velocity is reduced the impact force required of the impact generating transducer is increased, increasing the degree of destruction.

I have found that ultrasonic vibration alone is not satisfactory for testing and that it is essential to provide a means for impacting or throwing the article against the source of vibration.

In the foregoing general description of my invention I have set out certain objects, purposes and advantages. Other objects, purposes and advantages will be apparent from a consideration of the following description and the accompanying drawings in which.

Figure 1:
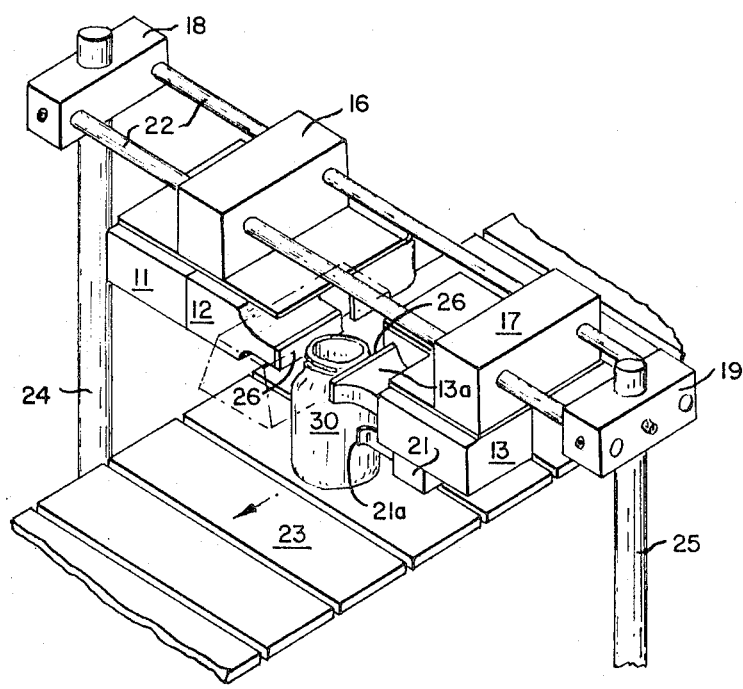
FIG. 1 is an isometric view of an apparatus according to my invention.

In the drawings I have illustrated an ultrasonic transducer 11 fixed to and driving a velocity transformer 12. The assembly of transducer 11 and transformer 12 is mounted on a guide block 16 which is suspended on the traverse rods 22. An impact generator 13 is mounted on traverse rods 22 through guide block 17. The traverse rods 22 are mounted in vertical guide blocks 18 and 19 movable on vertical posts 24 and 25 on opposite sides of conveyor 23. A proximity switch 21 is suspended from the impact generator with a sensing member 21a extending over conveyor 23 so as to be contacted by an article, such as jar 30, moving on the conveyor. Wear resistant shoes 26 are fitted on the velocity transformer 12 for protection against wear and impact damage.

The operation of the apparatus of my invention is as follows. A jar 30 to be tested is placed on conveyor 23 and moved toward the transformer 12 and impact generator 13 so as to pass between them and coming in contact with impact generator 13 on its output member 13a. As jar 30 approaches the transducer it contacts sensing member 21a which actuates switch 21 and thereby energizes tranducer 11, generator 13 and transformer 12. The jar 30 passing between transformer 12 and generator 13 is struck by the moving output member 13a of generator 13 and thrown against the vibrating velocity transformer 12. The impact generator does not hold the glassware against the transformer shoe 26 but simply throws it against the vibrating shoe 26, by first contacting and accelerating the glassware, and then stopping before the glassware has hit the shoe thereby allowing the glassware to separate from the generator and impact fully against the shoe. The concurrent impact and high velocity vibration results in the propagation of cracks originating in hair line cracks or fire checks in the jar lip. If no such defects are present the jar will pass on with the conveyor without damage. If the impact force generating device is one which produces high displacement with low clamped forces, it is obvious that defective jars will be fragmented or at least the lip portion carrying the defect will be destroyed. The extent of destruction is controlled by the velocity of member 13a on striking the jar 30 and the clamping force after impact. For high speed inspection, it is preferred that there is no clamping force after impact. Under such conditions a second sensor may be used down the line to activate a piston driven brush or ram to sweep the defective and destroyed jars or debris off the conveyor.

If it is desired to reduce or eliminate the hazard of shttered glass recourse to high ultrasonic velocities and very low impact forces such as those generated by bumping the jars against the velocity transformer in passing on the conveyor may be used. In such an arrangement the hair line defects and fire checks will be opened up and a conventional device for detecting grossly cracked jars can be used down the line from the transducer to activate a mechanism for sweeping defective jars off the conveyor.

My invention also contemplates the use of a shield 50 (in chain line), if desired, at the test station covering the openings of jars in front of and behind the test station and a plenum incorporating a blower or vacuum system to remove fine glass fragments from the test area.

Figure 2:
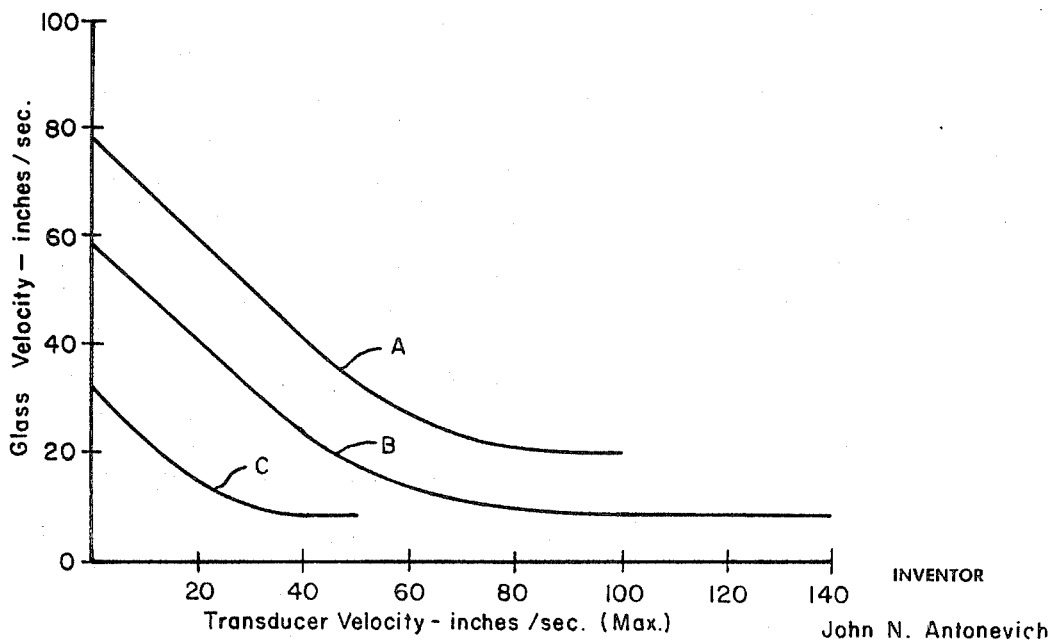
FIG. 2 is a graph showing combined effect of impact and vibration on glass testing.

The significance of the combined effect resulting from the impact of the glassware against the transducer will be seen from FIG. 2, showing the curve of breakage for new glassware A; glassware with one scribe mark B; and glassware with two scribe marks C.

While I prefer to use an ultrasonic transducer, the result can be achieved by a proper combination of impact with a sonic transducer and reference herein to a source of vibration includes such sonic transducers as well as ultrasonic transducers.

While I have illustrated and described certain presently preferred practices and embodiments of my invention in the foregoing specification, it will be understood that this invention may be otherwise embodied within the scope of the following claims.

I claim:

1. An apparatus for detecting fracture flaws in glassware comprising a source of vibration, impact generator means to move in the direction of said source of vibration and stop at a distance from said source which is greater than the width of the glassware and a conveyor for articles to be tested adjacent said source of vibration and generator adapted to deliver an article to be tested into contact with the generator whereby said glassware is first accelerated by said generator, then separates from said generator, and finally impacts said source of vibration.

2. An apparatus as claimed in claim 4 wherein the source of vibration is an ultrasonic transducer provided with a velocity transformer on one side of the conveyor and the impact generator is on the opposite side of the conveyor whereby the article to be tested passes between them.

3. An apparatus as claimed in claim 4 wherein sensing means are provided adjacent the conveyor to be contacted by an article to be tested and connections from said sensing means to said source of vibration and generator energizing the same each time an article passes the sensing means.

No references cited.

RICHARD C. QUEISSER, Primary Examiner

J. WHALEN, Assistant Examiner

U.S. Cl. X.R.

73—67